United States Patent [19]

Koschak et al.

[11] Patent Number: 5,004,624
[45] Date of Patent: Apr. 2, 1991

[54] SEMI-MOIST PET FOOD HAVING FREE GRAVY AND PROCESS FOR PREPARATION THEREOF

[75] Inventors: Francis L. Koschak, Irvine; Felicisimo S. Sarno, Cerritos, both of Calif.

[73] Assignee: Star-kist Foods, Inc., Long Beach, Calif.

[21] Appl. No.: 380,769

[22] Filed: Jul. 17, 1989

Related U.S. Application Data

[63] Continuation of Ser. No. 474,986, Mar. 14, 1983, abandoned.

[51] Int. Cl.$^5$ ................................. A23K 1/00
[52] U.S. Cl. .................... 426/623; 426/630; 426/646; 426/805
[58] Field of Search ............... 426/72, 307, 361, 623, 426/630, 335, 532, 326, 641, 646, 805

[56] References Cited

U.S. PATENT DOCUMENTS

| | | |
|---|---|---|
| 3,119,691 | 1/1964 | Ludington ..................... 426/646 X |
| 3,202,514 | 8/1965 | Burgess et al. . |
| 3,380,832 | 4/1968 | Bone . |
| 3,482,985 | 12/1969 | Burgess et al. . |
| 3,615,652 | 10/1971 | Burgess et al. . |
| 3,634,104 | 1/1972 | Kaplow et al. ..................... 426/805 |
| 3,653,908 | 4/1972 | Buck et al. . |
| 3,732,112 | 5/1973 | Frankenfeld et al. . |
| 3,736,148 | 5/1973 | Katz . |
| 3,769,042 | 10/1973 | Kaplow et al. . |
| 3,836,685 | 9/1974 | Schara et al. . |
| 3,852,483 | 12/1974 | Oborsh et al. . |
| 3,873,736 | 3/1975 | Palmer et al. . |
| 3,908,025 | 9/1975 | Miller et al. . |
| 3,930,031 | 12/1975 | Kealy . |
| 3,984,576 | 10/1976 | Burkwall, Jr. et al. . |
| 4,001,445 | 1/1977 | Horrocks et al. . |
| 4,022,915 | 5/1977 | Zukerman . |
| 4,039,692 | 8/1977 | Clausen . |
| 4,048,342 | 9/1977 | Haas et al. . |
| 4,049,835 | 9/1977 | Haas et al. . |
| 4,054,674 | 10/1977 | Barker et al. . |
| 4,055,676 | 10/1977 | Foulkes . |
| 4,104,406 | 8/1978 | Stringer et al. . |
| 4,143,171 | 3/1979 | Buckley et al. . |
| 4,158,706 | 6/1979 | Ernst et al. . |
| 4,190,679 | 2/1980 | Coffee et al. . |
| 4,191,783 | 3/1980 | Burkwall, Jr. et al. . |
| 4,212,894 | 7/1980 | Franzen, Jr. et al. . |
| 4,294,857 | 10/1981 | Fuller . |
| 4,371,557 | 2/1983 | Oppy et al. . |
| 4,371,558 | 2/1983 | Siregar et al. . |
| 4,410,551 | 10/1983 | Comer ................................. 426/99 |

FOREIGN PATENT DOCUMENTS 1290811 9/1972 United Kingdom .

Primary Examiner—R. B. Penland
Attorney, Agent, or Firm—Fulwider, Patton, Lee & Utecht

[57] ABSTRACT

A shelf-stable, semi-moist pet food, wherein partly farinaceous solid pieces are covered by or immersed in an aqueous free gravy. The solid pieces are prepared to be resistant to significant swelling or disintegration when in contact with an aqueous liquid, preferably by incorporating binding means such as vital wheat gluten. A preferred aqueous gravy has a pH of less than about 4.7 and a sufficiently low water activity so that the gravy itself is also shelf stable. The mixture of gravy and solid pieces has a water activity of less than about 0.9 and a pH of less than about 4.7 to resist microbiological growth.

1 Claim, No Drawings

SEMI-MOIST PET FOOD HAVING FREE GRAVY AND PROCESS FOR PREPARATION THEREOF

This is a continuation of copending application Ser. No. 474,986 filed on Mar. 14, 1983 abandoned.

BACKGROUND OF THE INVENTION

This invention relates generally to food products, and more particularly to an intermediate moisture, shelf stable pet food having a free gravy.

Pet foods are generally classified into one of three groups, depending upon the method of manufacture and, particularly, the moisture content of the final product. Dry pet foods, having less than about 12% total water content, are typically prepared from farinaceous base materials, with additions of proteinaceous materials for nutritional purposes. Dry pet foods are microbiologically stable without refrigeration, primarily because the very low moisture contents will not support microbiological growth. While such foods are convenient in that they may be stored in a sack at room temperatures and exposed to the atmosphere, they are the least palatable of the pet foods and have the lowest perceived desirability for the purchaser of the pet food.

At the high end of the moisture scale are moist pet foods, usually having more than about 60% water content. Moist pet foods are typically prepared from meat, meat by-products, poultry, poultry by-products, and fish and fish by-products. Further, because of the high water content such pet foods must be sterilized and preserved by techniques such as canning to avoid microbiological growth prior to consumption by the animal. Once the can is opened, the pet foods must be consumed relatively quickly to avoid spoilage.

Semi-moist pet foods have an intermediate amount of from about 15% to about 40% total water content, and are formulated so as to present an attractive compromise between dry and moist pet foods. The semi-moist pet foods are more stable than moist pet foods, and typically more palatable to the animal and attractive to the purchaser than dry pet foods. Semi-moist pet foods, are familiar to most pet owners as being provided as single servings packaged in a foil or film pouch. Such pouches may be conveniently stored at room temperature for extended periods.

Semi-moist pet foods are often prepared by extrusion of formulations based upon mixtures of farinaceous and proteinaceous ingredients, with addition of water, perservatives, flavorants and colorants. See, for example U.S. Pat. No. 3,202,514. The semi-moist pieces may be colored and processed to simulate meat, as, for example, strands formed into hamburger-like patties.

Semi-moist pet foods usually have a pliable, plastic feel and texture, and are essentially dry to the touch. Although water is present in an amount of about 15% to about 40% by weight, the water is not visually evident on or in the pet foods. On the other hand, the presence of a visually evident liquid phase, termed herein a "free gravy," is particularly desirable. However, as yet there have been provided no semi-moist pet foods having a free gravy.

Shelf stable, intermediate moisture content human foods are known, wherein pieces of meat or vegetable are cooked or immersed in a low-water-content perservative liquid of low water activity. The liquid essentially dehydrates the meat or vegetable pieces, which have a high water activity, with the result that the final product has a net water activity sufficiently low to be microbiologically stable during storage. The cooking liquid may be packaged with the meat or vegetable pieces, or an additional liquid having a water activity essentially the same as the dehydrated piece may be added prior to packaging. Such approaches are not, however, suitable for the preparation of intermediate moisture pet foods. In the described approach for making human food, the starting material is a relatively expensive meat or vegetable piece, rather than the relatively inexpensive farinaceous and proteinaceous mixture that form the majority of the dry weight of semi-moist pet foods.

Accordingly, there has been a need for a semi-moist, shelf stable pet food having a free gravy, but whose solid pieces are prepared from conventional, relatively inexpensive, farinaceous and proteinaceous base materials. The present invention fulfills this need, and further provides related advantages.

SUMMARY OF THE INVENTION

The present invention provides a semi-moist, shelf stable pet food having a free gravy, wherein the solid pieces are prepared primarily from relatively inexpensive farinaceous and proteinaceous materials, and the gravy initially includes as much as about 35% to about 70% water for palatability and economy. The solid pieces and gravy components used to formulate the pet food may be separately prepared as individually shelf stable formulations, mixed to form the semi-moist pet food, and packaged for sale. The solid pieces, also sometimes termed chunks or kibs, do not swell significantly or disintegrate during preparation, shelf storage or serving of the pet food, even though they are in contact with an aqueous liquid having a relatively high moisture content. The resulting semi-moist pet food is nutritious and palatable for pets, and is attractive to consumers who purchase the product.

In accordance with the invention, a shelf stable semi-moist pet food having a free gravy comprises solid pieces formed in part from farinaceous ingredients, and resistant to swelling and disintegration during prolonged contact with an aqueous liquid, and a gravy initially having a relatively high water content, humectants to depress the water activity, and possibly acidulents. In a preferred embodiment, the solid piece is itself prepared from a semi-moist formulation and contains a binder to inhibit swelling and disintegration. Preferably, the binder is vital wheat gluten in an amount of about 0.25–2.0 % by weight, and most preferably at a level of about 1.0%. The gravy is prepared with a high water content, preferably from about 35% to about 70% by weight, humectants to reduce the water activity of the gravy to about 0.9 or less, and acidulents to reduce the pH of the gravy. When the solid pieces and the gravy are combined, water and humectants infuse from the gravy into the solid pieces, until the equilibrium water activity of the overall mixture is desirably less than about 0.9 and the equilibrium pH of the mixture is less than about 4.7. Control of the water activity and the pH of the mixture are related, in that lower water activities allow higher pH and vise versa, except for the limitation that the water activity should not substantially exceed 0.9.

Inasmuch as a portion of the initially combined gravy is infused into the chunks, the initial mixture must be prepared with an excess of liquid above that desired in the final product. In a preferred embodiment, wherein the solid pieces are themselves of a semi-moist formulation, if the ratio by weight of liquid to solid pieces in the initial mixture is less than about 1.2, little evidence of free gravy on the surface of the equilibrium product is observed. Increasing ratios of liquid to solid pieces in the initial mixture result in increasing amounts of free gravy in the final equilibrium product, and it is conceivable that very high ratios of gravy to solid could be utilized to form a soup-like product. However, the ratio of liquid to solid may not be varied independently of the composition of the liquid over all ranges of interest, since increasing amounts of liquid result in higher water activity in the final product. Therefore, additional humectants or essentially neutral ingredients such as liquid oils must be added to the gravy to maintain the desired water activity. These additional ingredients may interfere with the nutritional balancing of the pet food, and it has been found that an initial liquid to solid ratio of about 1.5 can be used to formulate a semi-moist pet food having a free gravy and meeting the nutritional requirements for a balanced pet food diet. A pet food product not meeting the nutritional requirements for a balanced pet diet, as for example a treat-type product, may also be prepared using the approach of the present invention.

The present invention represents a significant advance in the art of pet food products. A semi-moist pet food made in accordance with the present invention is economically prepared using high percentages (by dry weight) of farinaceous and proteinaceous materials in the solid pieces, and a high percentage of water in the gravy. Such a pet food has a free gravy covering the solid pieces or in which the pieces are immersed, yet is shelf-stable and retains the pieces without significant swelling or disintegration during preparation or storage.

Other features and advantages of the present invention will become apparent from the following more detailed description, which illustrates, by way of example, the principles of the invention.

DETAILED DESCRIPTION OF THE PREFERRED EMBODIMENT

In accordance with the invention, a shelf-stable semi-moist pet food having a free gravy comprises solid pieces formed in part from farinaceous ingredients, and resistant to swelling and disintegration, and an aqueous gravy initially having a relatively high water content, humectants to depress the water activity, and possibly acidulents. Preferably, binding means is included in the solid pieces, and the solid pieces are themselves prepared as a semi-moist formulation. In such preferred embodiment, the mixture of 1.5 parts by weight gravy to 1 part solid pieces reaches an equilibrium water activity of less than about 0.9, preferably about 0.89, and a pH less than about 4.7, preferably about 4.1. The reduced water activity and low pH inhibit microbiological activity of various kinds, thereby imparting shelf stability to the semi-moist pet food with free gravy.

In preparing the pet food in accordance with the preferred embodiment, the chunk or pieces are prepared separately from the liquid or gravy portion, and the solid pieces and gravy are then combined prior to packaging. In the described preferred embodiment, the as-prepared semi-moist solid pieces have a water activity of about 0.84, and the as-prepared gravy has a water activity of about 0.92. When the solid pieces and gravy are combined, the difference in water activity causes an infusion of components from the liquid into the solid phase. An equilibrium is reached at a water activity of about 0.89, about 24 hours or more after combining. In the following detailed description, preparation of the individual solid pieces and preparation of the liquid gravy will first be described, followed by a description of the combining and equilibrating of the two phases. Although it is not necessary that the water activity of the gravy be initially greater than the water activity of the solid pieces, such is possible as a result of the presence of the binder, and can desirably lead to softening of the solid pieces by infusion of humectants.

The solid pieces are desirably prepared from a mixture of farinaceous and proteinaceous materials. The precise selection and percentages of these farinaceous and proteinaceous components are not critical, except that the binding means should be included to impart resistance to swelling or disintegration of the solid pieces after prolonged contact with the aqueous gravy. The preferred binding means is vital wheat gluten, preferably in an amount ranging from about 0.25% by weight of the solid piece to about 2.0% by weight of the solid piece. If less than about 0.25% by weight is used, insufficient binding results. If more than about 2.0% by weight is used, the extruder used to produce the solid pieces requires excessively high power input. However, additions of more than about 2.0% by weight are not found to be harmful to the final product, but instead result in inconveniences and diseconomies as the solid pieces are being manufactured. Most preferably, the vital wheat gluten is present in an amount of about 1% by weight of the solid pieces. Other possible binding means yielding some of the beneficial results of vital wheat gluten include, but are not limited to, sodium caseinate, soy protein concentrate, and soy protein isolate, but it is expected that these alternatives will be less effective than vital wheat gluten.

The remaining ingredients making up the solid pieces are not critical in selection or amount. As is known in the art, a wide variety of farinaceous and proteinaceous ingredients may be used, as well as nutrients, flavoring agents, perservatives, colorants, and chemical additives. By "farinaceous" ingredient is meant those food stuffs containing a preponderance of starch and/or starch-like material. Examples are cereal grains and meals or flours obtained upon grinding cereal grain such as corn, oats, wheat, milo, barley, rice and the various milling by-products of the cereal grains such as wheat feed flour, wheat middlings, wheat mixed feed, wheat shorts, wheat red dog, oat groats, hominy feed, or any other such material. Also included as sources of farinaceous ingredients are the tuberous food stuffs such as potatos, tapioca or the like. If the farinaceous material includes wheat, such farinaceous material may supply a portion of the vital wheat gluten component required to bind the solid pieces. Proteinaceous materials may originate from plant or animal sources. Preferably, protein sources include soy bean meal and related products produced from soybeans, as well as meal produced from animals, including but not limited to poultry meal, fish meal or meat meal. Such ingredients also flavor the solid pieces, and in addition, other flavoring ingredients such as animal and fish byproducts may be added.

Fatty sources of energy such as tallow are also desirable. An effective amount of an antimycotic may be added as a mold inhibitor. Examples of antimycotics include sorbates such as potassium sorbate, or sorbic acid in an amount sufficient to prevent mold growth within the product, generally less than 1% by weight of the product. A small amount of salts may be added as a nutrient and to serve as a humectant in preserving the product. Other solutes such as sugars may also be added as humectants. An example of such a sugar solute is high fructose corn syrup or dextrose.

Vitamin and mineral additions may be added as specifically required for the animal consuming the pet food. For example, cats require calcium additions in their diets, and a source of calcium such as calcium carbonate may be added in a minor amount to meet this nutritional requirement. Finally, an acidulent such as an acidic natural product or an acid such as phosphoric acid may be added, to reduce the pH of the manufactured solid pieces. Since the pH of the equilibrated final pet food should be less than about 4.7, additions of acidulents to the solid pieces reduce the requirements for such additions to the gravy. The above listing of the ingredients is intended to be exemplary rather than exhaustive, and those skilled in the art will recognize that the precise composition of the solid pieces may be modified for the available ingredients and the feeding requirements of the animal.

The preferred composition ranges of a mixture for preparing a solid piece for combining with gravy and feeding to dogs is shown in the following table:

| Ingredients | Range in percent |
| --- | --- |
| meat and bone meal | 10-18 |
| soybean meal | 12-20 |
| wheat flour | 30-40 |
| corn gluten meal | 3-8 |
| vital wheat gluten | 0.25-2.0 |
| poultry hydrolysate | 3-10 |
| high fructose corn syrup (42% fructose) | 10-20 |
| phosphoric acid (75%) | 1-2 |
| potassium sorbate | 0-3 |
| tallow | 3-6 |
| vitamins and colorants | 0.75, | the total of such ingredients being 100 percent (all percentages herein are given in weight percent). In this solid piece for feeding to dogs, the meat and bone meal provide protein and improved palatability, the soybean meal provides protein, the wheat flour provides filler and texture, as well as a small amount of vital wheat gluten, the corn gluten meal provides protein, the vital wheat gluten serves as binder to resist swelling and disintegration, poultry hydrolysate improves palatability and is an acidulent, high fructose corn syrup serves as a humectant, phosphoric acid reduces the pH, potassium sorbate acts as a antimycotic, tallow softens the products and serves as a source of energy and nutrition, and vitamins and colorants are provided as desired. The presently most preferred mixture for manufacturing a solid piece for feeding to dogs has the following composition:

| Ingredient | Amount in weight percent |
| --- | --- |
| meat and bone meal | 13.9 |
| soybean meal | 19.9 |
| wheat flour | 36.15 |
| corn gluten meal | 5.0 |
| vital wheat gluten | 1.0 |
| poultry hydrolysate | 6.0 |
| high fructose corn syrup | 12.0 |
| phosphoric acid | 1.0 |
| potassium sorbate | 0.3 |
| tallow | 4.0 |

| Ingredient | Amount in weight percent |
| --- | --- |
| vitamins and colorants | 0.75 |

Similarly, the preferred range and most-preferred composition for a solid piece for feeding to cats is given in the following table:

| Ingredient | Preferred Range | Most Preferred Amount |
| --- | --- | --- |
| poultry by-product meal | 8-15 | 13.9 |
| soybean meal | 15-25 | 19.9 |
| wheat flour | 30-40 | 31.0 |
| corn gluten meal | 0-10 | 10.0 |
| calcium carbonate | 0.35 | 0.35 |
| vital wheat gluten | 0.25-2.0 | 1.0 |
| tuna solubles | 3-10 | 6.0 |
| phosphoric acid | 1.5-3.0 | 2.0 |
| high fructose corn syrup | 10-20 | 12.0 |
| potassium sorbate | 0.3 | 0.3 |
| tallow | 0-4 | 3.0 |
| vitamins and colorants | 0.55 total of 100 percent | 0.55 |

As will be observed, most of the ingredients in the solid piece composition for feeding to cats are common with the solid piece composition for feeding to dogs. Included in the composition for feeding to cats is poultry by product meal, a source of protein and flavor, calcium carbonate, a source of calcium required in the diet of cats, and tuna solubles, a fish flavoring that appeals to cats.

The above-described ingredients may be formed into solid pieces of a preferred shape and size by any of the means known to those skilled in the art. Preferably, the ingredients are mixed together at room temperature and extruded at elevated temperature, in a manner so that the piece is expanded upon emerging from the extruder. When so processed, mixtures of the above-described compositions yield a shelf-stable solid piece of distinct shape and typically having a total moisture content of about 15-35%. In an alternative embodiment, the solid pieces may be produced without expansion, therefore being inherently more resistant to swelling and disintegration when contacted to an aqueous liquid. In such an alternative embodiment, the amount of binding means may be significantly reduced.

The liquid gravy is formulated to contain a high percentage of water, but the amount of water is limited by the need to maintain the water activity of the gravy and of the equilibrated final pet food product at a level of less than about 0.9. Further, the gravy is the principal source of acidulents to maintain the pH of the gravy and of the equilibrated final pet food product at a level of less than about 4.7. Humectants to reduce the water activity include solids and liquids soluble in water, such as sugar, salt and polyhydric alcohols. Sources of acidulents may include acids such as phosphoric or citric acid, or may include other sources of acid such as liver hydrolysate. Liquids that do not modify the water activity may also be added to increase the amount of liquid in the gravy without increasing the water activity. For example, vegetable oil or poultry fat may be added for this purpose. Finally, minor amounts of antimycotics and preservatives, colorants, nutrients, thickeners and antioxidants may be added as required.

As will be described more fully below, the precise composition of the gravy is determined in part by the ratio of gravy to solid pieces selected for the final product. For a preferred ratio of gravy to solid piece of about 1.5, a preferred gravy composition is set forth in the following table:

| Ingredient | Preferred Range |
| --- | --- |
| water | 40–60 |
| liver hydrolysate | 0–15 |
| vegetable oil | 3–20 |
| propylene glycol | 11–16 |
| dextrose | 0–16 |
| liver | 0–6 |
| salt | 2–4 |
| potassium sorbate | 0–3 |
| locust bean gum | 0–0.4 |
| liquid caramel | 0–0.5 |
| BHA | .0005–.002 |
|  | Total of 100 weight percent |

The water and vegetable oil provide liquidity, and the liver and liver hydrolysate provide flavor to the gravy. The liver hydrolysate is an acidulent component produced by heating a mixture of poultry viscera, liver, potassium sorbate and acid with the resulting product having a pH of about 2.0. Acid may be substituted in whole or in part for the liver hydrolysate, in an amount sufficient to render the final pet food product at a pH of less than about 4.7. For example, about 0 25–0.5 percent phosphoric acid may be substituted entirely for the liver hydrolysate. Salt, dextrose and propylene glycol reduce the water activity of the gravy. Additionally, salt provides a flavorant and nutrient, and dextrose improves the palatability of the gravy. Propylene glycol is a polyhydric alcohol which acts as a humectant, and is also an antimycotic. Other polyhydric alcohols such as glycerine could be substituted for some of the propylene glycol. Potassium sorbate serves as an antimycotic, liquid caramel is a colorant, locust bean gum gives body and thickness to the gravy, and BHA is an antioxidant for the vegetable oil.

A most preferred gravy formulation for use with the most preferred cat solid piece formulation, in a mixture ratio of 1.5 parts gravy by weight to 1 part solid piece by weight (prior to equilibration) is presented in the following table:

| Ingredient | Preferred Weight Percent |
| --- | --- |
| water | 56.87 |
| liver hydrolysate | 11.0 |
| vegetable oil | 4.6 |
| propylene glycol | 13.4 |
| dextrose | 5.0 |
| liver | 5.0 |
| salt | 3.0 |
| potassium sorbate | 0.3 |
| liquid caramel | 0.5 |
| locust bean gum | 0.33 |
| BHA | .0005 |

In preparing the gravy, the gravy ingredients are mixed together and heated to at least 180° F. for 20 minutes in a steam jacketed kettle, and then cooled. The final mixture has a pH of about 4.0 and a water activity of about 0.92. The gravy is found to be shelf-stable, even though its water activity is greater than 0.9, because of the low pH of the gravy.

The solid pieces and gravy, prepared as described above, are combined together to form the animal food product. Because the water activity of the gravy is initially higher then that of the solid pieces, water infuses into the solid pieces after the two components are combined. Other components of the gravy are transported into the solid pieces with the water, and specifically humectants such as propylene glycol are transported into the solid pieces to soften them. In the described preferred embodiment, after infusion the solid pieces are somewhat resilient to the touch, and return to about their original shape after being compressed. Liquid is held in the solid pieces in a sponge-like fashion, and is forced out of the solid pieces when compressed.

As water and other components are transported from the gravy into the solid pieces after combining, the relative fraction of free gravy decreases with time, until the water activities of the gravy and the solid pieces approach an equilibrium with a water activity at about 0.89. In pet food products made in accordance with the preferred processing described above, this equilibration process requires about 24 hours or more. After equilibrium is approached, no further decrease in relative fraction of liquid is observed. Moreover, because of the presence of the binding means in the chunks, the chunks do not swell significantly or disintegrate either during the equilibration process or with extended exposure and storage after equilibrium is reached. The pet food may be packaged for sale either before or after equilibrium is reached.

Because the relative fraction of free gravy decreases during the equilibration process, the initial mixture of gravy and chunks must contain a higher relative fraction of free gravy than is intended in the final product. In the preferred embodiment described above, an initial ratio of gravy to solid pieces less than about 1.2 results in complete absorbtion of the gravy into the solid pieces so that no free gravy remains in the finished product. Even without a free gravy, such a pet food is a desirable semi-moist product. For increasing ratios of gravy to solid pieces in the initial mixture, the final product first takes the appearance of shiny solid pieces, then liquid-coated solid pieces, then a thick stew-like mixture, and finally a soup with an excess of liquid having solid pieces therein. Each of these formulations and appearances is within the scope of the invention, and selection of the final product appearance is a matter of choice for the processor.

However, the ratio of gravy to solid may not be arbitrarily varied without constraints. In the range of gravy to solid pieces from about 1.2 to 1, up to about 2 to 1, as the ratio of gravy to solid increases, the relative amount of water in the final product also increases with the result that the water activity of the final product increases. If the overall water activity of the mixture, either before or after equilibration, is raised substantially above 0.9, the product tends to lose its microbiological stability. Therefore, as the relative fraction of gravy is increased, the formulation of the gravy may be modified so that the water activity is maintained within necessary limits for microbiological stability. Methods of adjusting the water activity are known to those skilled in the art, and include, for example, increasing the water soluble humectants such as sugar, salt and propylene glycol. Another approach is to increase the non-water active liquid components, such as liquid fats and oils.

While such modifications may be satisfactory for the purpose of controlling the water activity of the mixture, yet further limits are imposed by nutritional requirements for the animals to be fed. Thus, increasing the amounts of such components as sugars, salt and fats above certain levels may be nutritionally unacceptable, while increasing amounts of propylene glycol may reduce palatability. It has been found that a nutritionally balanced cat food may be formulated by mixing the most preferred gravy and cat food chunk formulations described above, in an initial ratio of 1.5 parts gravy by weight to 1 part chunk. This mixture is initially rather soupy, but after equilibration for about 24 hours the cat food appears as solid chunks covered by a thick gravy coating.

The following examples illustrate application of the preferred embodiment of the invention, but should not be interpreted as limiting the scope of the invention:

EXAMPLE 1

To determine the acceptable range of additions of vital wheat gluten, a series of formulations were prepared according to the following table.

| Ingredients | Weight Percentages | | |
|---|---|---|---|
| | Ex. 1-1 | Ex. 1-2 | Ex. 1-3 |
| Poultry By-Product meal | 15.4 | 13.9 | 15.4 |
| Soybean Meal | 16.9 | 19.9 | 16.4 |
| Wheat Flour | 36 | 31 | 35.0 |
| Corn Gluten Meal | 9 | 10 | 9 |
| Calcium Carbonate | .35 | .35 | .35 |
| Vital Wheat Gluten | .5 | 1.0 | 2.0 |
| Tuna Solubles | 5.0 | 6.0 | 5.0 |
| Phosphoric Acid | 2.0 | 2.0 | 2.0 |
| High Fructose Corn Syrup | 12 | 12 | 12 |
| Tallow | 2 | 3 | 2 |
| Vitamins and Colorants | .55 | .55 | .55 |
| Potassium Sorbate | .3 | .3 | .3 |

In each instance, the ingredients were mixed together and processed in a screw type extruder. The extruder heated the ingredients under pressure to above 212°F., so that upon emerging from the extruder, water was flashed off and the emerging product was expanded. The resulting extruded product contains sufficient moisture to be classified as semi-moist pet food.

Solid pieces of each of the above formulations were combined with the cat food gravy of Example 3-1 in an amount of 1.5 parts gravy to 1 part solid pieces, by weight. The mixtures were equilibrated for 24 hours and observed In each case, the resulting product was acceptable, and the solid pieces did not swell by more than a few percent or lose their integrity and disintegrate after exposure. Moreover, the equilibrated mixtures could be stirred without loss of integrity of the solid pieces. The final cat foods using solid pieces of Examples 1-1, 1-2, and 1-3 were fed to cats, and the palatability was found to be acceptable.

While all of the above formulations were acceptable, it was observed that the pieces formulated according to Example 1-1 had lower integrity than those formulated according to Examples 1-2 or 1-3. Therefore, it is believed that solid pieces having a total wheat gluten content less than about half of that of Example 1-1 would not have the necessary integrity after exposure to aqueous liquid.

The integrity of the solid pieces prepared according to Example 1-3 was excellent, but it was observed during the extrusion operation that the power required by the extruder was unusually high. It is believed that the additional vital wheat gluten increases the strength of the mixture in the extruder so that additional extrusion force is necessary. Since there does not appear to be any benefit to increasing the vital wheat gluten content above the level shown in Example 1-2, it is preferred to hold the vital wheat gluten at about 1% to avoid excessive power usage in the extruder. However, it is believed that higher levels of vital wheat gluten would not be deleterious to the product.

EXAMPLE 2

Solid pieces for use in a dog food were prepared according to the following formulation:

| Ingredients | Percentages |
|---|---|
| Meat and bone meal | 13.9 |
| Soybean meal | 19.9 |
| Wheat flour | 36.15 |
| Corn gluten meal | 5.0 |
| Vital wheat gluten | 1.0 |
| Poultry hydrolysate | 6.0 |
| High fructose corn syrup | 12.0 |
| Phosphoric acid | 1.0 |
| Potassium sorbate | 0.3 |
| Tallow | 4.0 |
| Vitamins and colorants | 0.75 |

The solid pieces were prepared according to the process described in Example 1.

Solid pieces were mixed with the cat food gravy of Example 3-1 in a ratio of 1.5 parts gravy to one part solid pieces. This product was fed to dogs in comparative palatability tests, wherein the dog had the choice of consuming the pet food with free gravy of Example 2, or a popular semi-moist commercial dog food. The two dog foods were equally acceptable to the dogs.

EXAMPLE 3

A series of examples were prepared to determine the preferred ratio of gravy to solid pieces in a cat food product. The solid pieces were prepared according to the formulation of Example 1-2, and a series of gravy formulations was prepared according to the following table:

| Ingredients | Percentage | | | | |
|---|---|---|---|---|---|
| | Ex. 3-1 | 3-2 | 3-3 | 3-4 | 3-5 |
| Water | 56.87 | 51.86 | 46.86 | 41.85 | 36.84 |
| Liver hydrolysate | 11.0 | 11.0 | 11.0 | 11.0 | 11.0 |
| Vegetable oil | 4.6 | 9.6 | 14.6 | 19.6 | 24.6 |
| Propylene glycol | 13.4 | 13.4 | 13.4 | 13.4 | 13.4 |
| Dextrose | 5.0 | 5.0 | 5.0 | 5.0 | 5.0 |
| Liver | 5.0 | 5.0 | 5.0 | 5.0 | 5.0 |
| Salt | 3.0 | 3.0 | 3.0 | 3.0 | 3.0 |
| Potassium sorbate | 0.3 | 0.3 | 0.3 | 0.3 | 0.3 |
| Liquid caramel | 0.5 | 0.5 | 0.5 | 0.5 | 0.5 |
| Locust bean gum | 0.33 | 0.33 | 0.33 | 0.33 | 0.33 |
| BHA | .0005 | .001 | .0015 | .002 | .0025 |

The various gravy formulations were prepared by the procedure previously described. Decreasing amounts of water and increasing amounts of vegetable oil (i.e., progressing from Example 3-1 to Example 3-5) resulted in the water activity progressively decreasing from 0.92 in Example 3-1 to 0.84 in Example 3-5. The final equilibrated pet food product had a shinier appearance with increasing amounts of the vegetable oil, since increasing fractions of the water were fully absorbed into the solid pieces as the total amount of water was decreased. Hence, the amount of free gravy was greatest for the formulation of Example 3-1, and progressively decreased for the formulations having less water. The gravy of Example 3-1 is judged to be preferred, but each of the other gravy formulations is also acceptable.

EXAMPLE 4

A series of examples was prepared with varying initial ratios of liquid to solid pieces, ranging from 1.2 to 1, up to 2.0 to 1. The preferred solid pieces formulation of Example 1-2 and the preferred gravy formulation of Example 3-1 were utilized. For a ratio of 1.2 to 1, the water activity was 0.87, but there was very little free gravy remaining after equilibration. The amount of free gravy and the water activity progressively increased with increasing ratio of gravy to solid pieces, and for a ratio of 2.0 to 1 the water activity was observed to be 0.91–0.92. While water activity at this level is acceptable in view of the low pH of the pet food, it is preferred to leave a margin for error in production operations by keeping the water activity at a level of about 0.89. The pet food having a ratio of gravy to solid pieces of 1.5 to 1 had a water activity of 0.89, and in addition, had a desirable appearance. Therefore, the pet food having a ratio of gravy to solid pieces of 1.5 to 1 was chosen as the preferred formulation. This preferred formulation is shelf stable, meets the nutritional requirements for a balanced cat food diet, and has a sufficient amount of free gravy to present a desirable appearance.

EXAMPLE 5

A series of pet foods was prepared following the same approach as described for Example 4, except that the gravy formulation was that of Example 3-5. Because of the relatively low water content of the gravy and the relatively high oil content, the water activity of all formulations was less than 0.89. However, for the lower ratios of gravy to solid pieces, all of the liquid was absorbed into the solid pieces during the equilibration progress, leaving no free gravy. At the higher ratios of gravy to solid pieces, all of the water in the gravy was absorbed into the solid pieces during equilibration, leaving only an oily liquid in the final product. While all of these formulations would be usable and acceptable, they were judged less desirable than those formulations produced in Example 4.

EXAMPLE 6

A liquid was prepared according to the formulation presented at Column 5, lines 40–62, of U.S. Pat. No. 3,634,104. Solid pieces of a variety of dry and semi-moist cat foods, including pieces prepared in accordance with Example 1-2, were combined with this liquid in a ratio of 1.5 parts liquid to 1 part solid pieces by weight. Because the liquid prepared according to the '104 patent has very little water, little if any water was infused into the solid pieces. When representative samples of these mixtures were presented to cats for palatability testing, in each case the cat rejected the mixture. It is believed that the cats rejected this mixture because of the very low moisture and high glycerine contents. Thus, it is not possible to prepare an acceptable pet food from partly farinaceous solid pieces using the approach set forth in U.S. Pat. No. 3,634,104.

It will now be appreciated that through the use of this invention, a shelf-stable, semi-moist pet food having a free gravy may be prepared. Partly farinaceous solid pieces and an aqueous gravy formulation are prepared and combined, whereupon equilibration occurs. The solid pieces are stable against swelling and disintegration in the aqueous liquid. Although a particular embodiment of the invention has been described in detail for purposes of illustration, various modifications may be made without departing from the spirit and scope of the invention. Accordingly, the invention is not to be limited except as by the appended claims.

We claim:

1. A process for preparing a shelf-stable semi-moist nutritionally balanced pet food having free gravy consisting of the steps of:

intermixing milled farinaceous and proteinaceous ingredients with 0.25 to 2.0 percent by weight of vital wheat gluten binder, said binder capable of imparting structural integrity to kibs formed with said intermixture when immersed in an aqueous solution;

forming kibs with said intermixture having a water activity of less than 0.9;

preparing a liquid gravy having a water activity of less than 1.0 but greater than the water activity of the kibs;

combining the kibs and gravy in a ratio of more than about 1.2 parts by weight gravy to 1 part by weight kibs; and packaging said combination and allowing said water activities in said components to equilibrate prior to consumption wherein said equilibrated semi-moist pet food has a water activity of less than 0.9 and a pH of less than about 4.7.

* * * * *